Figure 5:
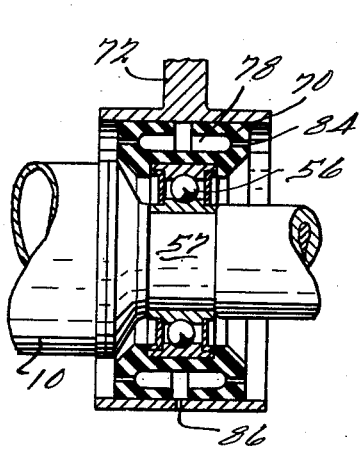

Sept. 11, 1962  G. E. DUNN  3,053,584
RESILIENT BEARING MOUNT
Filed Sept. 19, 1958  2 Sheets-Sheet 1
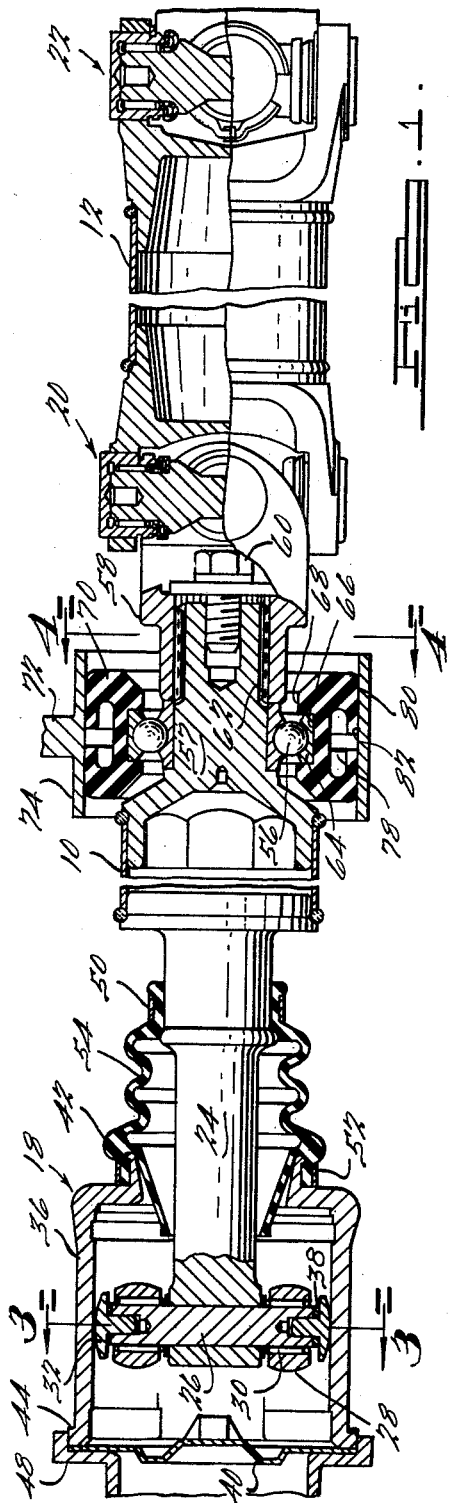
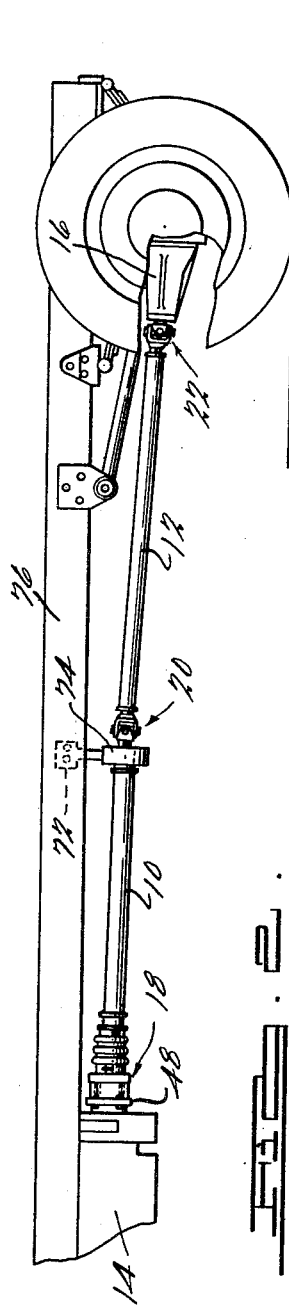
INVENTOR.
George E. Dunn
BY
Harness and Harris
ATTORNEYS.

Sept. 11, 1962

G. E. DUNN 3,053,584

RESILIENT BEARING MOUNT

Filed Sept. 19, 1958

2 Sheets-Sheet 2

INVENTOR.
George E. Dunn.
BY
Harness and Harris
ATTORNEYS.

United States Patent Office 3,053,584
Patented Sept. 11, 1962

3,053,584
RESILIENT BEARING MOUNT
George E. Dunn, Dearborn, Mich., assignor to Chrysler Corporation, Highland Park, Mich., a corporation of Delaware
Filed Sept. 19, 1958, Ser. No. 762,083
2 Claims. (Cl. 308—28)

My invention relates to motor vehicles, boats, and other structures utilizing split or sectional power transmitting shafts and more particular to an improved intermediate or center bearing support for the sectional shafts, which support will isolate and eliminate the transmission of vibrational forces from said shaft to its supporting frame member.

The use of the so-called center bearing supported sectional propeller shaft presents several problems because of the necessity of using a vibration isolation mounting at the center bearing. The isolating mount has a resonant frequency dependent on its stiffness and on the amount of mass it supports. The resonant frequency of the mounting must be kept low (below 25 cycles per second) in order that the sensitivity to unbalance is not beyond commercial limits.

Also secondary bending forces that are radial to the axis of the propeller shaft due to universal joint angularity produce forces that are transmitted to the center bearing and may be evidenced by a shudder or vibration of the center bearing. The forces causing shudder are proportional to the torque transmitted and to the angles at which the shaft connected universal joints operate, although a certain amount of cancellation can be achieved by the proper phasing of the joints.

Substantial longitudinal movement of the split shaft in automobiles is caused by the up and down movement of the rear wheels tending to straighten the angle of the shafts at the center universal joint and thereby move the section of the shaft adjacent the transmission toward the transmission. In the particular application of the present invention disclosed herein, a universal joint is used to connect the engine crankshaft to the first section of the split drive shaft which joint is of the type which allows longitudinal motion of the shaft as well as angular motion. This longitudinal motion of the joint must be taken up by the center bearing support in order to eliminate the transmission of forces to the frame supporting said bearing.

This longitudinal motion and the vibration caused by the angularity of the center universal joint is absorbed in in the present instance by means of a resilient plastic bearing support having a cavity therein concentric with the bearing, which cavity allows the support to roll or otherwise change its shape readily to allow movement of the bearing in all directions with respect to the mounting. Unless the movement of the center bearing is extremely and abnormally violent, the resilient support will absorb the aforesaid forces without itself becoming noticeably compressed or otherwise stressed. Should the shock absorbing properties of this resilient support be required to be increased, either the size of the fluid cavity therein may be increased or said cavity may be vented to the atmosphere to allow a bleed type of action. The size of the cavity in proportion to the mass of plastic material in the support may be varied within wide ranges to product a resilient bearing support of any desirable shock absorbing characteristics.

A major object of this invention is to provide a resilient support for the frictionless bearing adjacent the center universal joint of a split or sectional propeller shaft which resilient support absorbs vibration and movement of said center bearing without transmitting any significant portion thereof to the frame.

Another object is to provide a resilient support as aforesaid which performs its vibration and movement absorbing function without itself becoming significantly stressed or compressed.

A further object is to provide a resilient support as aforesaid which combines elasticity and fluid compression to provide greater shock absorbing qualities thereto.

Figure 3:
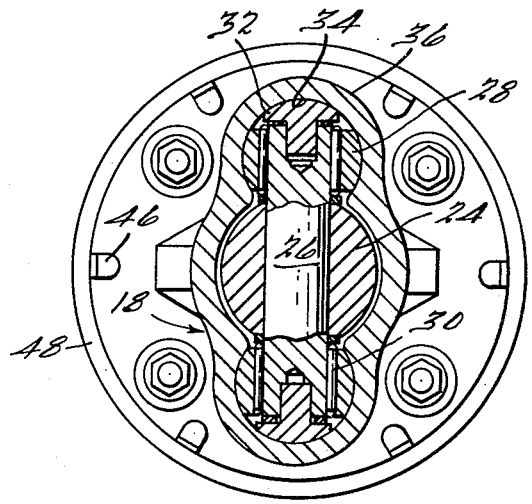
Figure 4:
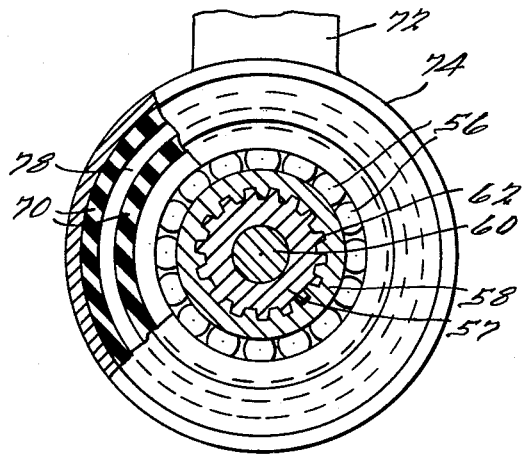
Figure 2:
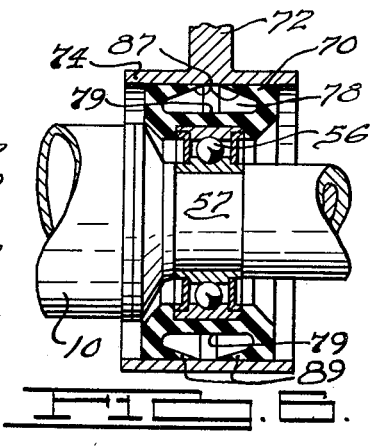

Further objects and advantages will become apparent from the following description and drawings, in which:
FIGURE 1 represents a view partly in section of a split drive shaft and universal joint and center bearing support assembly;
FIGURE 2 is a side elevational view of a particular application to an automobile of the assembly of FIGURE 1;
FIGURE 3 represents a view in cross section taken along line 3—3 of FIGURE 1 in the direction of the arrows;
FIGURE 4 represents an elevational view taken along line 4—4 of FIGURE 1 in the direction of the arrows;
FIGURE 5 represents a cross sectional view of a variation of the resilient support of FIGURE 1; and
FIGURE 6 represents a cross sectional view of a variation of the resilient support of FIGURE 1.

Referring to the drawings and in particular to FIGURES 1 and 2, a drive shaft having a first portion 10 and a second portion 12 of welded steel tubing, or the equivalent, is operatively connected between the transmission 14 and a differential 16 through universal joints 18, 20, and 22. Universal joint 18 is substantially of the type and construction shown in Patent 2,825,213 and is provided with an axially shiftable shaft 24 connected to a cross pin 26 having rollers 28 rotatably mounted thereon through needle bearings 30. Pin 26 is also provided with centering buttons 32 which slidably engage the cylinder guides 34 (see FIGURE 3) in body 36. Rollers 28 also contact cylinder guides 34 and when biased to one side of said guides roll longitudinally thereof in response to longitudinal motion of shaft 24. The curvature of rollers 28 and buttons 32 allow pin 26 to rock around its center point to provide complete freeness of movement to shaft 4. Springs 38 urge centering buttons 32 into resilient contact with guides 34 to prevent shaft 24 from loosely fitting in body 36. The guides 34 and adjacent areas in body 36 are packed with grease which grease is retained therein by cover pan 40 and boot 42. The cover pan is held tightly against flange 44 of body 36 by bent over tabs 46 and by companion flange 48 which flange is integrally connected to the engine transmission 14. Boot 42 is secured to shaft 24 by a sealing strap 50 and the body 36 by a sealing strap 52. It is noted that boot 42 is provided with corrugations 54 allowing said boot to expand and contract longitudinally of shaft 24.

Universal joints 20 and 22 may be of the common cross-type such as shown in Reissue Patent 20,799. Since the present invention is not concerned with the specific structure of joints 20 and 22, further discussion thereof is deemed unnecessary.

The center bearing 56 is secured to an end portion 57 of drive shaft segment 10 by means of a collar 58 and bolt 60. Collar 58 is integral with universal joint 20 and is splined at 62 to portion 57 of drive shaft segment 10 to rotate therewith. Bearing 56 is provided with an outer race or housing 64 which is frictionally or adhesively secured in a bearing mounting portion 66 in the aperture 68 of resilient spacer 70 said portion comprising an annular retaining groove. Attachment means 72 secures annular support bracket 74 to the frame 76 of the vehicle. A fluid cavity 78 is provided in member 70 and substantially concentrically surrounds the bearing housing 64. This cavity may be made air tight by adhesively securing the outer edge 80 of member 70 to the inner edge 82 of member 74. As aforesaid, should it be desired to alter the cushioning or shock absorbing ability of member 70 for a particular application the size of cavity 78 may be altered and/or suitable bleeds such as shown by 84 and/or 96 in FIGURE 5 may be provided at several points around member 70. Member 70 may be made of natural rubber or rubberlike material such as the synthetic Buna N rubbers, neoprene, etc.

The essential characteristic of member 70 is that it is capable of rolling about cavity 78 without substantially stressing or compressing the rubber material. This property allows greater shock absorbing qualities and longevity of the support member 70.

In FIGURE 6, the fluid cavity 78 of member 70 is partially defined by tapered shoulders or cam surfaces 87 which increase the size of cavity 78 to allow for greater lateral movement of rear wall 79 toward member 74. Moreover, the bearing of wall 79 against cam surfaces 87 will urge portions 89 of member 70 toward the opposite open ends of member 74. Such an arrangement increases the shock absorption character of member 70.

I claim:

1. A split shaft center bearing mount comprising a support bracket having a substantially horizontally extending bearing supporting sleeve, a spacer sleeve of substantially rectangular cross sectional peripheral configuration formed of rubber-like material mounted concentrically within said bracket sleeve, said spacer sleeve having an internal cavity extending circumferentially thereof that is at least half the width of the spacer sleeve and of substantial thickness, the inner peripheral surface of said spacer sleeve having a circumferentially extending groove therein providing a bearing retaining seat, said spacer sleeve internal cavity being of such size and shape that the surrounding side wall portions of the spacer sleeve provide radially extending leg portions that are sufficiently flexible to permit the bearing supported in the mount spacer sleeve groove to shift freely in all directions without unduly stressing the spacer sleeve material, said spacer sleeve cavity being connected to the atmosphere by bleed port means that pierce wall portions of the spacer sleeve.

2. A split shaft center bearing mount comprising a support bracket having a substantially horizontally extending bearing supporting sleeve, a spacer sleeve of substantially rectangular cross sectional peripheral configuration formed of rubber-like material mounted concentrically within said bracket sleeve, said spacer sleeve having an internal cavity extending circumferentially thereof that is at least half the width of the spacer sleeve and of substantial thickness, said cavity being of inverted T-shaped cross section with the head of the T extending axially and the T-stem extending radially outwardly, the inner peripheral surface of said spacer sleeve having a circumferentially extending groove therein providing a bearing retaining seat, said spacer sleeve internal cavity being of such size and shape that the surrounding side wall portions of the spacer sleeve radially extending leg portions that are sufficiently flexible to permit the bearing supported in the mount spacer sleeve groove to shift freely in all directions wtihout unduly stressing the spacer sleeve material, said spacer sleeve cavity being connected to the atmosphere by bleed port means that pierce wall portions of the spacer sleeve.

References Cited in the file of this patent

UNITED STATES PATENTS

| | | |
|---|---|---|
| 2,081,237 | Jantsch | May 25, 1937 |
| 2,092,291 | Olsen | Sept. 7, 1937 |
| 2,195,647 | Guy | Apr. 2, 1940 |
| 2,308,969 | Biesing | Jan. 19, 1943 |
| 2,614,896 | Pierce | Oct. 21, 1952 |
| 2,825,213 | Dunn | Mar. 4, 1958 |
| 2,851,314 | Thomson | Sept. 9, 1958 |
| 2,906,572 | Wroby | Sept. 29, 1959 |
| 2,933,354 | Primeau | Apr. 19, 1960 |

FOREIGN PATENTS

| | | |
|---|---|---|
| 66,979 | France | May 13, 1957 |
| (1st addition to 1,102,771) | | |

UNITED STATES PATENT OFFICE
CERTIFICATE OF CORRECTION

Patent No. 3,053,584            September 11, 1962

George E. Dunn

It is hereby certified that error appears in the above numbered patent requiring correction and that the said Letters Patent should read as corrected below.

Column 1, line 3, for "particular" read -- particularly --; column 2, line 42, for "4" read -- 24 --; column 3, line 6, for "96" read -- 86 --; column 4, line 18, after "sleeve" insert -- provide --; line 21, for "wtihout" read -- without --.

Signed and sealed this 9th day of April 1963.

(SEAL)
Attest:

ESTON G. JOHNSON            DAVID L. LADD

Attesting Officer            Commissioner of Patents